Oct. 20, 1970     A. K. MOULTON     3,534,981
TRAILER LOAD BALANCING AND STABILIZING DEVICE
Filed Aug. 27, 1968
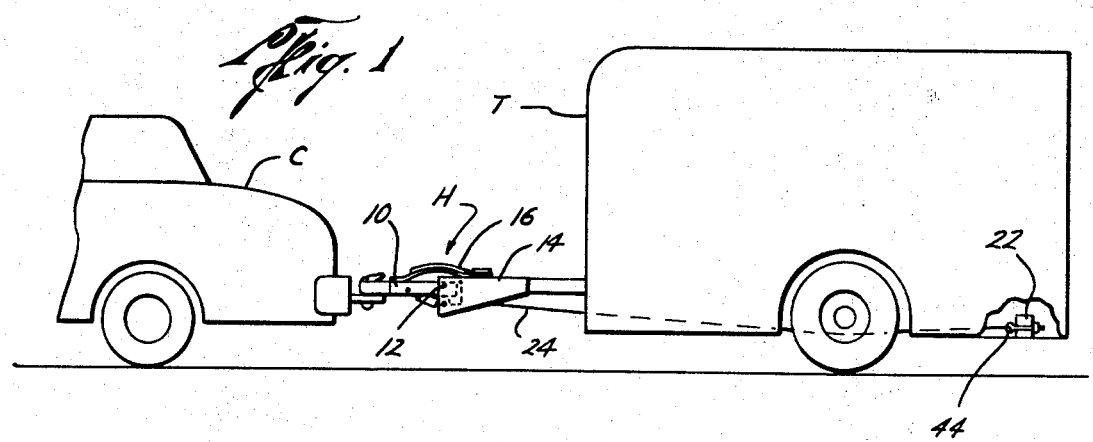
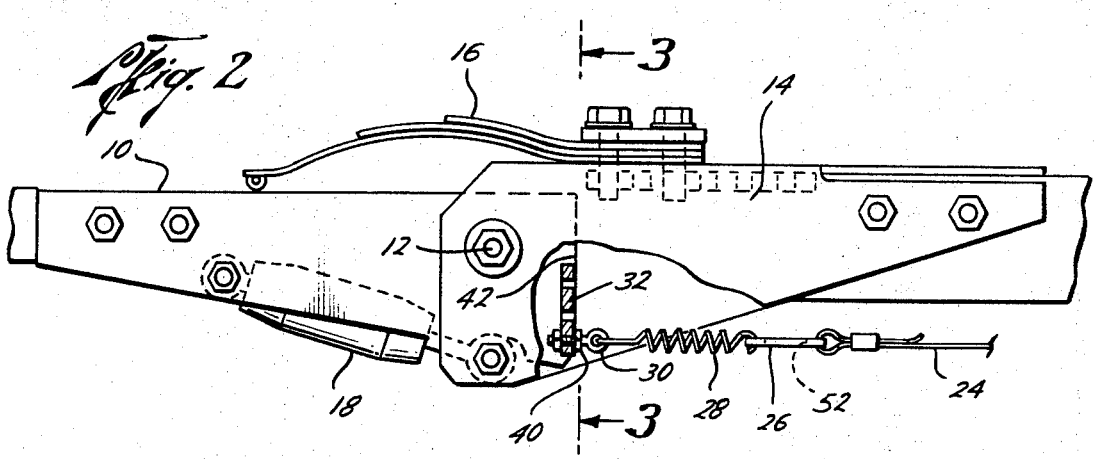
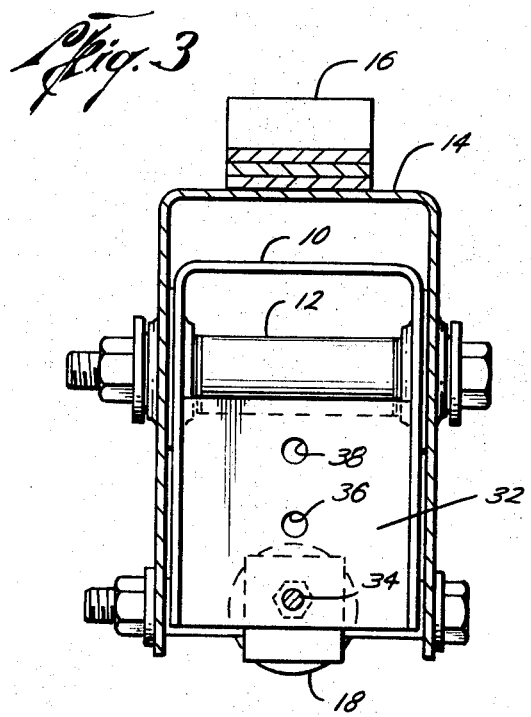
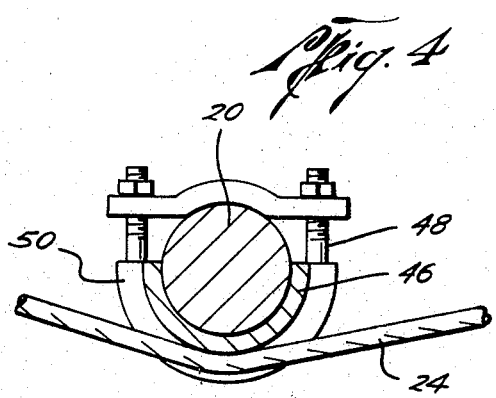
Arthur K. Moulton
INVENTOR.
BY *J. Vincent Martin*
*Joe E. Edwards*
*Jack R. Springate*
ATTORNEYS 3,534,981
TRAILER LOAD BALANCING AND
STABILIZING DEVICE
Arthur K. Moulton, 9569 Ash Creek Drive,
Dallas, Tex. 75228
Filed Aug. 27, 1968, Ser. No. 755,585
Int. Cl. B60d 1/00
U.S. Cl. 280—405         10 Claims

ABSTRACT OF THE DISCLOSURE

An apparatus for stabilizing and balancing a trailer load for a trailer connected to a towing vehicle by a drawbar and a tongue pivotally mounted with respect to each other including a cable connecting from the drawbar at a point spaced vertically from the axis of the pivot, extending past the wheel axle and spaced vertically from the axle axis, and connecting to a portion of the trailer so that the cable tension exerts a force moment on said trailer about its axle axis to balance the trailer loading and to stabilize its movement about its axle axis during towing.

SUMMARY

The present invention relates to an improved apparatus for balancing and stabilizing loads of trailers.

In loading single axle trailers, it is not always possible to obtain an exact balance of the trailer load with respect to the axle. Even when the trailer load is balanced, movements during towing create unbalancing movements which are preferred to be stabilized.

It is therefore an object of the present invention to provide an improved apparatus which both balances and stabilizes the load distribution in a trailer.

Another object is to provide a load balancing and stabilizing apparatus for a trailer which is relatively inexpensive and easy to install.

A further object is to provide an improved trailer load balancing and stabilizing apparatus which is adjustable to balance the load distribution force moment about the trailer support.

Still another object is to provide an improved load balancing and stabilizing apparatus which is adjustable to balance trailer loads wherein the adjustment may balance small load unbalanced moments or may be compounded to balance large load unbalanced moments.

BRIEF DESCRIPTION OF THE DRAWINGS

These and other objects and advantages of the present invention are hereinafter described and explained with reference to the drawings wherein:

FIG. 1 is an elevation view showing a trailer and a portion of the towing vehicle and further illustrates the load balancing and stabilizing apparatus of the present invention.

FIG. 2 is a detail elevation view of the trailer hitch shown in FIG. 1 with portions thereof broken away to show the connection of the load stabilizing cable to the trailer hitch.

FIG. 3 is a sectional view taken along line 3—3 in FIG. 2 to show the alternate connecting positions of the load stabilizing cable to the trailer hitch.

FIG. 4 is a sectional view of the axle of the trailer showing the details of the mounting of the cable guide.

DESCRIPTION OF THE PREFERRED EMBODIMENTS

The trailer load balancing and stabilizing device of the present invention is illustrated in the drawings on a single axle trailer T which is connected to a towing vehicle or car C by a trailer hitch H. The trailer hitch H may be of any suitable form as hereinafter explained but for purposes of illustration, the trailer hitch disclosed in my prior application Ser. No. 588,029, filed Oct. 20, 1966 and now Pat. No. 3,414,294 is shown. The hitch H includes a drawbar 10 which connects to the car C and is pivotally mounted by the pin 12 to the tongue 14 which connects to the trailer T. The hitch H also includes the spring 16 which resists pivoting movement of the drawbar 10 and tongue 14 about the pin 12 in one direction and the shock absorber 18 which dampens the relative movements of drawbar 10 and tongue 14 about pin 12. Both drawbar 10 and tongue 14 are channel-shaped with the open end of the channels facing downwardly when installed between the car C and the trailer T.

Since the function of the device of the present invention is to balance and stabilize the trailer load, such device is connected to provide a balancing or righting force to the trailer when it tilts about its axle. The device as shown is a flexible tension member extending from the drawbar 10 under the trailer axle 20 to the frame 22 of trailer T at a point to the rear of the axle 20. As best seen in FIGS. 2 and 4, the flexible tension member is illustrated as a wire cable 24 having suitable connections to the drawbar 10 and the frame 22 as hereinafter described.

The end of the tension member which connects to drawbar 10 includes the slotted plate 26 to which cable 24 is attached and the tension spring 28 which connects between slotted plate 26 and eyebolt 30. The bracket 32 is suitably secured as by welding between the flanges of drawbar 10 as shown in FIGS. 2 and 3. The bracket 32 provides a plurality of positions, each of which is spaced a different distance from pin 12, for connecting eyebolt 30 to drawbar 10. These positions are provided by the holes 34, 36 and 38 in bracket 32. These holes are positioned approximately midway between the flanges of drawbar 10 and are vertically spaced with respect to each other. The eyebolt 30 extends through one of these holes and is secured therein by the nuts 40 and 42 threaded on eyebolt 30 and positioned on opposite sides of bracket 32. Since it is desirable that the tension in cable 24 be adjustable, this adjustment is provided by threading the nuts 40 and 42 either direction on eyebolt 30. As stated, the other end of cable 24 is secured to the frame 20. Eyebolt 44 which is secured to the end of cable 24 extends through frame 22 and may be adjustably secured therein by a pair of nuts in a manner similar to the adjustable attachment of eyebolt 30 to bracket 32.

In order for the tension in the cable 24 to provide a balancing force to trailer T, a means is provided for guiding and spacing cable 24 a preselected distance below the axis of axle 20. Such means should also provide a relatively friction-free surface over which cable 24 may slide to assure that the trailer load is stabilized during movement of the car C and trailer T. This guiding and spacing means is provided by the half sleeve 46 which is held against the underside of axle by a pair of spaced apart U-bolt clamps 48, only one of which is shown in FIG. 4. Sleeve 46 includes a pair of radially extending spaced apart flanges 50 which define a guiding groove in which cable 24 is adapted to slide.

The spacing of cable 24 from the axis of axle 20 determines the moment arm of the force exerted on trailer T by the tension in the cable 24. This spacing should be preselected to provide the desired moment arm but consideration should also be given to avoid having the cable spaced too far below the axle 20 and possibly being damaged by obstacles over which the trailer is towed.

The slotted plate 26 is provided for those trailers having a jack or stand secured to the trailer tongue to allow the jack or stand to extend through the slot 52 in plate 26 without interferring with the operation of the trailer load balancing and stabilizing device.

In operation, the device of the present invention is installed on the trailer T and hitch H with the eyebolts 30 and 44 loosely connected. With the trailer T loaded and hitch H connected to the car C, the tension in cable 24 is adjusted. The trailer load should create a forward unbalance. The cable tension exerts a force moment compensating for this forward unbalance. The cable tension in addition to pulling downward on the rear portion of trailer T, exerts a force moment on the hitch H which force because of its offset from pin 12, tends to pull the ends of drawbar 10 and tongue 14 spaced farthest from pin 12 downwardly with respect to pin 12. In effect, this force lifts the forward end of trailer T to additionally balance the forward unbalance of the trailer load. The effectiveness of the cable tension on the trailer hitch H depends on which of the holes 34, 36 or 38 in which eyebolt 30 is secured. Since hole 34 is spaced farther from pin 12, the force moment of the cable tension when eyebolt 30 is secured in hole 34 is greater or compounded with respect to the force moment when it is installed in holes 36 or 38. In effect, the different positions of holes 34, 36 and 38 determine the effective moment arm of this force.

During movement of car C and trailer T, the device of the present invention provides a stabilizing of the trailer load. For example, if the forward end of the trailer T moves downwardly, the rear end of trailer T moves upwardly and the drawbar 10 pivots in a clockwise direction about the pin 12 as viewed in FIG. 2. Both of these movements tend to elongate the tension member to thereby increase the force moments about axle 20 and pin 12 resisting the downward movement of the forward end of trailer T. Also, if the rear end of trailer T moves downwardly, the drawbar 10 pivots in a counterclockwise direction about pin 12 and both such movements contribute to a relaxing of the tension in the tension member to reduce the balancing moments about axle 20 and pin 12 causing the trailer T to return to the desired balanced position. Thus, the device of the present invention provides both a static balancing of the trailer load and a dynamic stabilizing of the trailer load. The spring 28 is included in the flexible tension member to absorb shocks and to allow elongation of the tension member so that while stabilizing forces are exerted, the return of the trailer to its desired position is accomplished smoothly.

While the flexible tension member is shown in the illustrations to connect below the pin 12 and to extend below the axle 20, it should be understood that it could be connected above the pin 12 and extend above the axle 20, particularly for trailers which consistently are loaded with a rearward unbalance. Also, any suitable pivotal hitch between the car C and trailer T may be used by providing a means of connecting the end of the tension member in offset relation to the axis of the pivot of the hitch.

In the drawings and preceding description, the trailer T is shown and described as a single axle trailer. The device of the present invention, however, may be used on any trailer in which load balancing and stabilization is desired such as for example, a double axle trailer in which the two axles are positioned close together with the trailer extending beyond the axles a sufficient distance to create a load balancing and stabilizing problem.

From the foregoing, it can be seen that the improved device of the present invention provides improved trailer load balancing and load stabilizing. It is a simple device which is easily installed and adjusted and includes a flexible tension member connecting across the pivotal connection between the trailer and the towing vehicle to exert a load balancing force moment to the trailer. This device is adjustable to increase or decrease the force exerted and is further adjustable to preselect the desired moment arm or offset from the axis of the pivotal connection between the trailer and the towing vehicle.

The foregoing disclosure and description of the invention are illustrative and explanatory thereof, and various changes in the size, shape and materials, as well as in the details of the illustrated construction, may be made within the scope of the appended claims without departing from the spirit of the invention.

What is claimed is:

1. A load balancing and stabilizing device for a trailer having a pivotal connection to a towing vehicle, comprising:
   a flexible tension member,
   means for connecting said tension member to the vehicle side of and offset from said pivotal connection,
   means for connecting said tension member to the trailer,
   and means for guiding and spacing said tension member below the axis of the axle of said trailer whereby the tension member exerts a force moment on said trailer about the axis of the trailer axle,
   said flexible tension member being connected to said pivotal connection at a point offset below the pivotal axis of said pivotal connection.

2. A device according to claim 1, wherein said flexible tension member includes:
   a flexible cable, and
   a tension spring connected to said cable whereby changes in effective length of said tension member result in changes in forces exerted by the ends of said tension member.

3. A device according to claim 1, wherein
   said guiding and spacing means is secured to said axle and coacts with said tension member to allow said tension member to slide thereon.

4. A device according to claim 1 including:
   means for adjusting the tension in said flexible tension member to balance the trailer load.

5. A device according to claim 2, wherein said first connecting means includes:
   an eyebolt connected to said cable and having a threaded shank extending through a hole in the vehicle portion of said pivotal connection, and
   a pair of nuts threaded on said threaded shank on opposite sides of said hole to provide an adjustment of the tension in said cable.

6. A device according to claim 1, including:
   a slotted plate connected in said flexible tension member and so positioned with respect to said trailer so that the trailer jack may extend through the solt in said slotted plate without interfering with the operation of said device.

7. A stabilizing device for a trailer having a hitch with channel-shaped members pivotally connected about a horizontal axis, one of said members being a draw-bar adapted to be connected to a towing vehicle and the other of said members being a tongue adapted to be connected to the trailer, comprising:
   a flexible tension member,
   means connecting one end of said tension member to the drawbar of said hitch at a point offset from the pivotal axis of said hitch, means guiding and spacing an intermediate portion of said tension member from the axle axis of said trailer, and means connecting the opposite end of said tension member to said trailer to exert a righting force moment on said trailer responsive to movement of said trailer about its axle axis.

8. A device according to claim 7, wherein said drawbar connecting means includes:

a plate secured to said drawbar and defining a plurality of holes in which said tension member may be secured to preselect the offset from the pivotal axis of said hitch.

9. A device according to claim 7, wherein said tension member is connected below the pivotal axis of said hitch and extends below said axle axis of said trailer.

10. A device according to claim 7, wherein said guiding and spacing means includes:

a half sleeve having spaced radially extending flanges to define a groove therebetween to receive said tension member, and means securing said sleeve to said trailer axle.

References Cited

UNITED STATES PATENTS

| | | |
|---|---|---|
| 2,507,189 | 5/1950 | Arehart. |
| 2,546,206 | 3/1951 | Arehart. |
| 2,691,533 | 10/1954 | Koontz. |
| 2,847,231 | 8/1958 | Miller _____ 280—405 X |
| 3,093,393 | 6/1963 | Madden. |
| 3,295,866 | 6/1967 | Standfuss _____ 280—489 X |
| 3,414,294 | 12/1968 | Moulton _____ 280—489 |

LEO FRIAGLIA, Primary Examiner

U.S. Cl. X.R.

280—489